(Model.)
A. KNAPP.
HOOF PARER AND EVENER.
No. 316,978. Patented May 5, 1885.
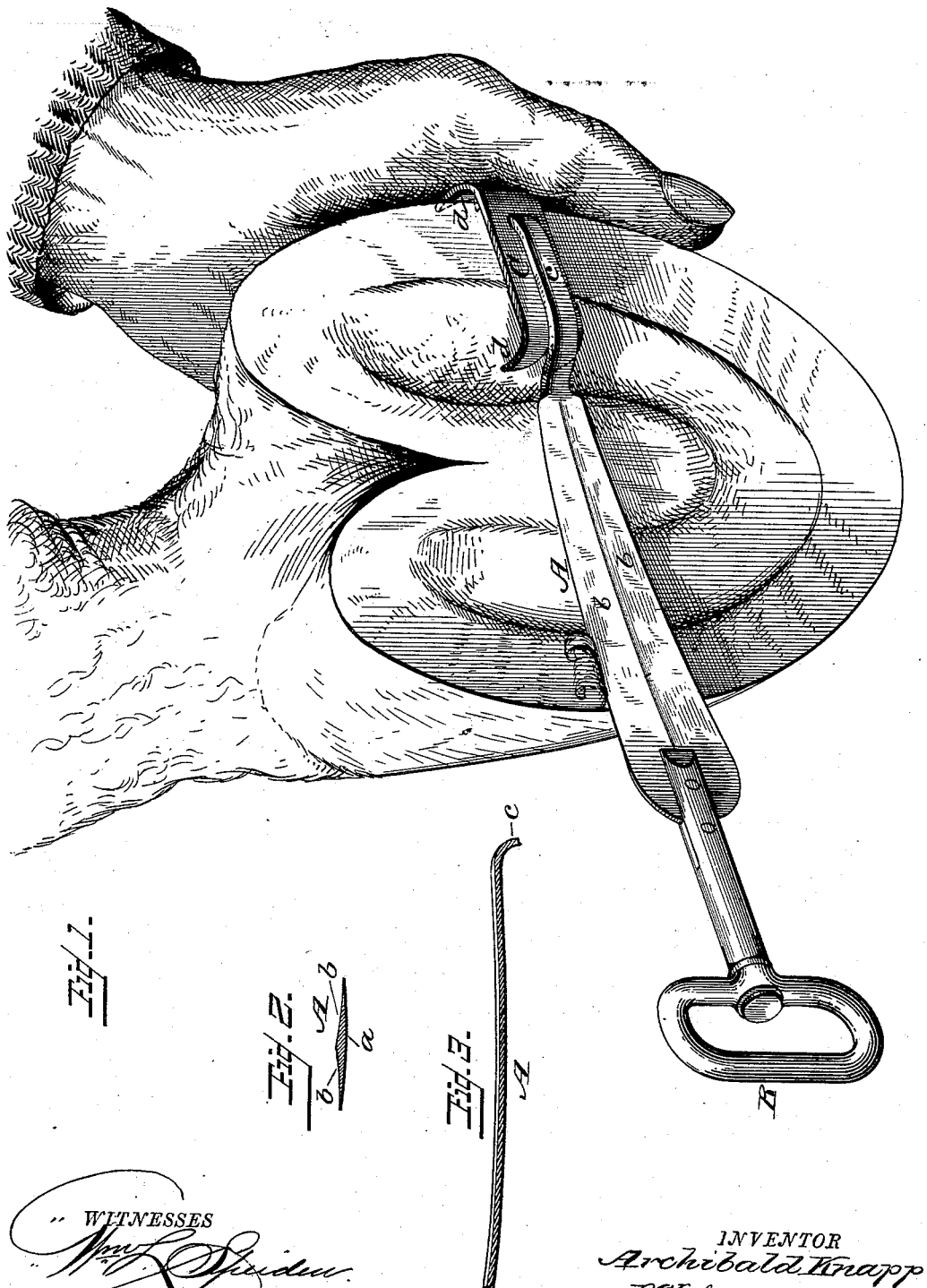
WITNESSES
INVENTOR
Archibald Knapp
per
Chas. H. Fowler
Attorney

UNITED STATES PATENT OFFICE.

ARCHIBALD KNAPP, OF STRAWTOWN, INDIANA.

HOOF PARER AND EVENER.

SPECIFICATION forming part of Letters Patent No. 316,978, dated May 5, 1885.

Application filed September 30, 1884. (Model.)

*To all whom it may concern:*

Be it known that I, ARCHIBALD KNAPP, a citizen of the United States, residing at Strawtown, in the county of Hamilton and State of Indiana, have invented certain new and useful Improvements in Hoof Parers and Eveners; and I do hereby declare that the following is a full, clear, and exact description of the same, reference being had to the annexed drawings, making a part of this specification, and to the letters and figures of reference marked thereon.

Figure 1 of the drawings is a perspective view showing my improved implement in use; Fig. 2, a transverse section through the blade, and Fig. 3 a longitudinal central section thereof.

The object of the present invention is to provide an implement that will effectually pare and even the hoofs of horses and other animals, and in which the knife can be lengthened or shortened at will in order to adjust the implement to any sized hoof; also regulating the knife to increase or decrease the thickness of the shave. These objects I attain by the construction substantially as shown in the drawings and hereinafter described and claimed.

In the accompanying drawings, A represents the blade of the implement, provided at its rear end with a suitable handle, B, which may be secured to the shank of the blade by screws or rivets, as found desirable. The blade A is tapering, being widest at the heel or rear end, and gradually diminishing in a direction toward its forward end, and has a cutting-edge on each side, so that the implement can be operated in a direction either to the right or left, as circumstances require. The blade A is convex on its under or inner side, as shown at *a*, in a direction transversely from edge to edge, so that the blade will more easily pass over the surface of the hoof when the blade is moving in the arc of a circle. The blade is also curved from heel to point, or in a longitudinal direction, as shown more clearly in Fig. 3, so that as little surface will come in frictional contact with the hoof as possible, thus rendering the implement more easily operated. The blade upon its upper or outer surface is beveled from the center to each edge, as shown at *b*, to give it strength and prevent it from springing while cutting. The point or forward end of the blade A terminates in a shank, *c*, to which is suitably pivoted a toothed plate, C, to form a grab for securing the point of the knife to the hoof and act as a fulcrum therefor. The plate C is rectangular in form, having two teeth, *d*, at each end, as shown, and is pivoted to the shank *c* away from its center or near one end of the plate, thus enabling the operator to shorten or lengthen the blade at will by bringing the teeth that are nearest to or farthest from the pivotal connection against the outer side of the hoof, as shown in Fig. 1.

The blade being on a taper, as heretofore described, enables it to cut the shaving loose on the outside of the hoof in advance of the inside, thus preventing splintering, and the under side of the blade being slightly convex enables the operator to increase or decrease the thickness of the shaving while cutting.

The curve of the blade not only renders it more readily passed over the surface of the hoof with comparatively little friction, but the taper extending throughout the length of the blade from heel to point pares the inside of the hoof and leaves the outside or horn part the highest, so that the shoe will not rest on the sole of the hoof.

To operate the implement, first place the hoof of the horse between the legs of the operator, the same as in using the common hoof-knife. Then take the handle of the implement in the right hand and lay the blade directly across the bottom of the hoof near the heel of the foot. With the left hand set the grab on the inside of the hoof and hold it securely against the same, after which bring the knife-blade by its handle back with the right hand until the edge is behind the heel of the hoof, and then set the knife to cut the thickness of shaving required. The left hand is held firmly on the grab, when a sweeping cut with the right hand is made far enough to cut the shave past the toe of the foot. Reverse the operation by taking the handle of the knife in the left hand and the grab in the right, and proceed as before.

The implement can readily be made to increase or decrease the thickness of the shave while cutting by simply directing the edge of the blade upward or downward by the handle, the grab acting as a fulcrum and the blade as a lever, thereby giving the operator power to easily pare the hardest hoof both quickly and smoothly.

Having now fully described my invention, what I claim as new, and desire to secure by Letters Patent, is—

1. An implement for paring and evening the hoofs of animals, which consists of a blade having an edge on each side, and provided with a suitable handle at one end and a pivoted grab at its opposite end, said grab being formed of a rectangular plate with teeth at both ends, and the pivotal connection being near one end thereof, substantially as and for the purpose set forth.

2. In an implement for paring and evening the hoofs of animals, a double-edged blade provided at one end with a suitable handle, and at its opposite end having a shank on a different plane than the blade, in combination with a grab pivoted thereto at a point away from its center, said grab consisting of a rectangular plate formed with teeth at each end, substantially as and for the purpose set forth.

In testimony that I claim the above I have hereunto subscribed my name in the presence of two witnesses.

ARCHIBALD KNAPP.

Witnesses:
 W. A. DU BOIS,
 C. D. POTTER.